United States Patent Office 2,728,759
Patented Dec. 27, 1955

2,728,759

ACYLATED PROTEIN AND METHOD OF PRODUCING SAME

Havard L. Keil, Clarendon Hills, Ill., assignor to Armour and Company, Chicago, Ill., a corporation of Illinois No Drawing. Application April 17, 1951,
Serial No. 221,541

12 Claims. (Cl. 260—112)

This invention relates to the preparation of protein products and more particularly to the reacting of fatty acid halides with proteins. The products obtained may be employed as detergents and for various other uses such as imparting water insolubility to glue for paint additives and paper sizes, etc. The products may also be used for waterproofing leather goods, rendering tennis strings water resistant. The products lend themselves also to a large number of other uses, including uses in edible products.

The reaction of higher fatty acid chlorides with molecular split off products of albumen was suggested by Sommer in U. S. Patent No. 2,015,912. The fatty acid chlorides were reacted in an alkaline solution by the well known Schotten-Baumann reaction to give reaction products resembling soaps in their general properties. In later patents, the products were described as useful in cosmetics and in the treatment of paper, etc. In the later Patent No. 2,151,241, Sommer describes the above reaction but sets out a further attempt to purify the final product which contains sticky substances and can not be dried even with calcined salts. The purification was effected by dissolving the condensation product in an organic solvent and thus separating it from unreacted protein and sodium soaps which form as sides reactions.

It is apparent from a study of the above patents that the reaction was somewhat incomplete and that there were troublesome unreacted or side reaction products which interfered with the drying properties. The patentee sought to remove these troublesome products from the protein-fatty acid condensate rather than to cause a complete reaction. Calculations based on the first mentioned patent show that from 25 to 50% of the acid chloride was reacted with protein. A duplication of the process of the patent produces a very hygroscopic product which can not be dried successfully even with an equal weight of sodium sulphate.

Tucker in U. S. Patent No. 2,113,819, reacts peptones or lower molecular weight protein split products with fatty acid chlorides in the presence of organic solvents such as dioxane, benzol, etc. He employed a solvent in which the protein was insoluble and the acid chloride soluble. His figures indicate that only 50% of the acid chloride reacted with the hydrolyzed gelatin.

Since the fatty acid part of the reacted protein molecule is non-hygroscopic, I believe that the solution of the problem lies in getting more fatty acids to combine with the proteins, and an object of the invention is to provide a process in which there is a complete reaction of proteins or split products with the fatty acid halides or chlorides. A still further object is to provide a process in which the hydrolysate or split products of protein are treated in such a manner as to bring about a complete reaction of the protein products with the fatty acid halides or chlorides. Still another object is to treat the amino compounds or split products of the hydrolyzed protein in such a manner as to produce a more basic amine group which will bring about a complete reaction with the fatty acid chlorides, etc. Yet another object is to provide a process for the production of a detergent, emulsifying or waterproofing compound, through the complete reaction of the split products of proteins with fatty acid halides or chlorides. Still another object is to prepare new products through the complete reaction of proteins or the split products thereof with fatty acid halides, etc. Other specific objects and advantages will appear as the specification proceeds.

In one embodiment of my invention, a protein source such as hoofs, hair, horns, blood, meat, soy bean flakes, other vegetable protein, casein, etc., is hydrolyzed and to the hydrolysate is added an oxidizing agent which forms a hydroxyl group on the amine. A fatty acid halide may then be stirred into the solution for reaction with the oxidized product. I prefer to use fatty acid chlorides having from 1 to 22 carbon atoms in their hydrocarbon radical. Best results have been obtained with fatty acid chlorides having from 12 to 18 carbon atoms in the hydrocarbon radical.

As the oxidizing agent which forms a hydroxyl group on the amine in the above reaction, I prefer to employ hydrogen peroxide, but peracetic acid and permonosulphuric acid may also be used. The hydrogen peroxide is unusually effective, and it reacts well on the alkaline side and can be easily controlled. It oxidizes sulfides and gives a product a lighter color.

The reaction occurs without the addition of heat, the reagents generating their own reaction heat. After the reaction is complete, the resulting product is either dried alone or mixed with inorganic salts and dried.

I find that a successful method bringing about a complete reaction of proteins or the split products thereof with fatty acid halides or chlorides, is accomplished by treating the protein to produce a more basic amine group. The hydrogen peroxide or other oxidizing agent forms substituted hydroxyl amines from the aliphatic primary amines by the substitution of a hydroxyl for a hydrogen group. This in turn produces greater basicity than that possessed by the original primary amine of the protein. The resulting product may be represented as containing the following structure

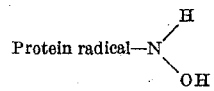

and may be called a protein substituted hydroxyl amine.

A characteristic of the products of the prior processes in which the fatty acid chlorides were incompletely reacted with protein split products was that such products were liquid. A characteristic of the product of the present process is that it is a solid product. By reacting from two to three times as much acid chloride as was possible with the prior processes, the product, instead of being liquid or semi-solid, is a solid product which is not sticky but which is somewhat soap-like in character. When used as a detergent, the product has a soapy feel with no stickiness and it may be incorporated with other wetting agents or soap builders.

Examples of the process may be set out as follows:

*Example 1*

To 1,000 grams of fresh cattle hoofs, was added sufficient water to cover (about 3,000 cc.), 50% or 500 grams of sodium hydroxide was stirred into the batch and the mixture was boiled for five hours. At the end of this time the biuret test for incompletely hydrolyzed protein was positive and the solution was concentrated by the boiling off of water until the total solids ran 60%. The pH was 10.5.

To 500 grams of the unfiltered liquid was added 10% or 30 cc. of 30% hydrogen peroxide and the mixture stirred for 3.5 hours. Next was added slowly, with stirring, 300 grams of lauryl chloride which, on the basis of hydrolysate solids, is a 100% addition. The mixture heated up to about 70° C. due to the reaction. At the end of the reaction, the mixture had about the consistency of Vaseline and had a fatty feel rather than a tackiness characteristic of peptones. When dried on pans in a wind oven at 130° F. the final product resembled a wax in texture. In order to obtain ready milling characteristics, such salts as sodium chloride, sodium sulphate, etc., were added up to at least 100% without detracting from the general properties. The final pH was 9.5 which is about the pH of laundry soap. Further neutralization to pH 7.0 is possible by adding an acid or acid salt. The final product did not precipitate in hard water, thus indicating that all fatty acid chlorides had reacted.

*Example II*

The process was carried through as described in Example I, except that palmityl chloride was used. The final product foamed well in hard water and could be boiled without the formation of a precipitate. The product had a detergent effect similar to soap and had a soapy feel. The foam volume, however, while good, was not as high as in Example I when lauryl chloride was used.

*Example III*

Oleyl chloride was used in a process similar to that in Example I. The final product foamed well in hard water and did not form a precipitate when boiled. The addition of soap dropped the foam volume while certain other wetting agents were compatible and tended to increase foaming. Alkaline reagents such as sodium carbonate and metasilicate were tolerated as builders up to about 10%. While having less foam volume than in Example I, the product easily tolerated 15% of trisodium phosphate which gives a much improved foaming.

*Example IV*

Stearyl chloride was employed in the process described in Example I and a product was produced which foamed well in hard water and could be boiled without forming a precipitate. The product showed detergent properties similar to soap and in water had a soapy feel with no stickiness. Additions were tolerated which increased the foaming and including up to 15% of trisodium phosphate. The same results were obtained using stearic iodide.

*Example V*

In a procedure as outlined in Example I, tallow acid chlorides were substituted for the lauryl chloride. A very good combination was obtained by first reacting lauryl chloride with about one-third of the protein weight followed by reacting about two-thirds of the protein with the longer chain tallow acid chlorides. The product gave considerable foam while also tolerating 15% of trisodium phosphate.

*Example VI*

The procedure of Example I was followed substituting for cattle hoofs, hydrolyzed whole blood. An excellent foam-forming detergent was obtained.

*Example VII*

In this procedure, hair was employed as a source of protein and was hydrolyzed by the use of sodium hydroxide. After boiling, peracetic acid was added and the mixture stirred for three hours; stearyl chloride was then stirred in slowly. After the reaction, the mixture was combined with equal parts of sodium chloride and dried. The product was an effective detergent and foamed well.

*Example VIII*

The procedure of Example I was followed but, instead of employing cattle hoofs, soy bean flakes were hydrolyzed and the hydrolysate was treated as described in Example I. The final product foamed well in hard water and could be boiled without formation of a precipitate. It had detergent properties similar to soap and in water had a soapy feel with no stickiness.

*Example IX*

To 100 grams of liquid stick concentrate (78% total solids) obtained in the rendering of lard, etc., was added 200 cc. of water containing 39 grams of sodium hydroxide. While stirring 8 cc. of a 30% hydrogen peroxide solution was slowly added and the mixture allowed to stand for about 1.5 hours. The agitator was again started and 78 grams of lauryl chloride was slowly added and agitation continued for about 10 minutes after completing the acid chloride addition. Sulphuric acid was then stirred in to bring the pH to 7.0. The material was dried and pulverized to give 186 grams of finished product. The product had detergent properties similar to soap and in water had a soapy feel with no stickiness.

The following typical compositions of matter which give good foaming, detergency, and can be ground to a powder are:

120 gms. dry protein hydrolysate (80 gms. protein, 40 gms. NaOH)
12 cc. 30% $H_2O_2$
40 gms. lauryl chloride
80 gms. tallow acid chlorides
240 gms. sodium sulphate or sodium chloride 480 gms. total 24 gms. dry protein hydrolysate (same as above)
2.4 cc. 30% $H_2O_2$
24 gms. tallow acid chlorides
10 gms. trisodium phosphate

*Example X*

3 pounds of a fatty acid halide (prepared by reacting lard flake fatty acids with phosphorous trichloride) was added slowly with stirring to 4 pounds of unhydrolyzed gelatin, and the mixture was allowed to stand at 60° C. to complete the reaction. The final reaction product was spread on vacuum trays and dried in a vacuum oven to give a final dried product.

*Example XI*

2 pounds of gelatin were dissolved in 10 pounds of water. 100 cc. concentrated hydrochloric acid were added and the mixture boiled for one hour. 250 cc. of 20% sodium hydroxide were then added to bring the pH to 6.2, 76 grams of 30% hydrogen peroxide were added to the solution. The pH was brought to 9.9 with 65 cc. of 20% sodium hydroxide, and the solution was allowed to stand overnight.

In the meantime, 2 pounds of lard flake fatty acids were melted and mixed with 164 grams of phosphorous trichloride, and the mixture was allowed to stand overnight in a separatory funnel.

The fatty acid chloride thus prepared was added slowly to the hydrolyzed gelatin with stirring. During addition of the chloride, the pH was held constantly at 7.5 by addition of sodium hydroxide solution. After all the fatty acid chloride had been added, the final pH was adjusted to between 7.5 and 8.0, and the mixture was allowed to stand in the warm at 60° C. to complete the reaction. The final reaction product, which is in pasty form, is spread on vacuum trays and dried in a vacuum oven to give a final dried product.

While I prefer to employ fatty acid chlorides, the process is effective when used with other fatty acid halides. The reaction process as carried out by the above method may be extensively applied to give desirable characteristics to proteins in substantially all forms. Native proteins may be reacted to give water insolubility such as glue for paint additives and paper sizing, etc. Leather goods may be permanently waterproofed. Tennis strings may be rendered water resistant without impairing flexibility. On the edible side, fats may be incorporated in dry cake, biscuit, etc. mixes, without danger of rancidity by combining with proteins such as egg white, soy bean hydrolysate, etc. High volume foaming substances can thus be made for both edible and inedible use. Sausage casings may be made more water resistant and there are many other uses which will be apparent. I have found that, for the above uses, it is necessary to react the protein substance with more than 50%, by weight, of the fatty acid halide, and most desirable results are obtained when the acylated protein contains at least 70%, by weight, of the fatty acid radical.

While in the foregoing specification, I have set forth certain embodiments of the invention in great detail for the purpose of illustrating the invention, it will be understood that such details may be varied considerably by those skilled in the art without departing from the spirit of my invention.

This application constitutes a continuation-in-part of my co-pending application Serial No. 66,393, filed December 20, 1948, now abandoned.

I claim:

1. A process which comprises reacting a compound selected from the group consisting of proteins and protein hydrolysates with an agent selected from the group consisting of hydrogen peroxide, peracetic acid, and permonosulfuric acid and then reacting the same with a fatty acid halide having from 1 to 22 carbon atoms in its hydrocarbon radical.

2. In a process for treating protein, the steps of hydrolyzing the protein, reacting the hydrolysate with an agent selected from the group consisting of hydrogen peroxide, peracetic acid and permonosulfuric acid, and then reacting the same with a fatty acid halide having from 12 to 18 carbon atoms in its hydrocarbon radical.

3. In a process for treating proteins for the purposes set forth, the steps of hydrolyzing the protein, reacting the same with an agent selected from the group consisting of hydrogen peroxide, peracetic acid and permonosulfuric acid, and then reacting the mixture with a fatty acid halide having from 1 to 22 carbon atoms in its hydrocarbon radical.

4. In a process for treating proteins for the purposes set forth, the step of hydrolyzing a protein, reacting the same with hydrogen peroxide, and then reacting the mixture with a fatty acid halide having from 1 to 22 carbon atoms in its hydrocarbon radical.

5. In a process for treating proteins for the purposes set forth, the step of hydrolyzing a protein, reacting the same with hydrogen peroxide, and then reacting the mixture with a fatty acid halide having from 12 to 18 carbon atoms in its hydrocarbon radical.

6. In a process for treating proteins for the purposes set forth, the step of hydrolyzing a protein, reacting the same with hydrogen peroxide, and then reacting the mixture with a fatty acid chloride having from 1 to 22 carbon atoms in its hydrocarbon radical.

7. In a process for treating proteins for the purposes set forth, the step of hydrolyzing a protein, reacting the same with hydrogen peroxide, and then reacting the mixture with a fatty acid chloride having from 12 to 18 carbon atoms in its hydrocarbon radical.

8. In a process for treating proteins for the purposes set forth, the step of hydrolyzing the protein to the peptide stage with sodium hydroxide in water solution, adding about 10% of hydrogen peroxide (30% solution), and reacting a fatty acid chloride completely with the oxidized protein hydrolysate.

9. A composition of matter resulting from the acylation of a protein containing a hydroxyl amine radical, wherein the acyl radical contains from 1 to 22 carbon atoms and constitutes more than 50% by weight of the original protein portion.

10. A composition of matter resulting from the acylation of a gelatin containing a hydroxyl amine radical, wherein the acyl radical contains from 12 to 18 carbon atoms and constitutes more than 50% by weight of the original gelatin portion.

11. A composition of matter resulting from the acylation of a protein containing a hydroxyl amine radical, wherein the acyl radical is a lauryl group and constitutes more than 50% by weight of the original protein portion.

12. A composition of matter resulting from the acylation of a protein containing a hydroxyl amine radical, wherein the acyl radical is a stearyl group and constitutes more than 50% by weight of the original protein portion.

References Cited in the file of this patent

UNITED STATES PATENTS

| | | |
|---|---|---|
| 2,113,819 | Tucker | Apr. 12, 1938 |
| 2,454,730 | Bakonyi | Nov. 23, 1948 |